(12) United States Patent
Chen et al.

(10) Patent No.: US 8,908,907 B2
(45) Date of Patent: *Dec. 9, 2014

(54) METHOD AND SYSTEM FOR VIDEO TRANSMISSION AND PROCESSING WITH CUSTOMIZED WATERMARKING DELIVERY

(71) Applicants: Xuemin (Sherman) Chen, Rancho Santa Fe, CA (US); Michael Dove, Los Gatos, CA (US); Thomas J. Quigley, Franklin, NC (US); Stephen Elliott Gordon, Lexington, KY (US); Jeyhan Karaoguz, Irvine, CA (US)

(72) Inventors: Xuemin (Sherman) Chen, Rancho Santa Fe, CA (US); Michael Dove, Los Gatos, CA (US); David Rosmann, Irvine, CA (US); Thomas J. Quigley, Franklin, NC (US); Stephen Elliott Gordon, Lexington, KY (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/718,736

(22) Filed: Dec. 18, 2012

(65) Prior Publication Data

US 2013/0111213 A1 May 2, 2013

Related U.S. Application Data

(63) Continuation of application No. 12/428,943, filed on Apr. 23, 2009, now Pat. No. 8,340,344.

(60) Provisional application No. 61/101,849, filed on Oct. 1, 2008.

(51) Int. Cl.
*G06K 9/00* (2006.01)
*H04N 19/164* (2014.01)
*H04L 29/08* (2006.01)

(Continued)

(52) U.S. Cl.
CPC ..... *H04N 21/8358* (2013.01); *H04N 19/00236* (2013.01); *H04L 67/18* (2013.01);

(Continued)

(58) Field of Classification Search
USPC .............. 382/100, 232, 240; 380/51, 54, 201, 380/210, 252, 287; 370/522–527; 283/72, 283/74–81, 85, 93; 713/176, 179; 358/3.28
See application file for complete search history.

(56) References Cited

U.S. PATENT DOCUMENTS

7,024,016 B2 * 4/2006 Rhoads et al. ................ 382/100
7,827,312 B2 * 11/2010 Ramaswamy et al. ........ 709/246

*Primary Examiner* — Abolfazl Tabatabai
(74) *Attorney, Agent, or Firm* — Garlick & Markison; Edward J. Marshall (57) ABSTRACT

Methods and systems for video transmission and processing with customized watermarking delivery are disclosed and may include watermarking data at a communication device utilizing received global positioning (GPS) data and communicating the watermarked video data to a receiving communication device. The receiving communication device may verify the watermarked data, and may determine whether to render the received watermarked data based on the verification. The communication device may include an edge device, and may receive a feedback signal communicated from the receiving communication device. The watermarking of subsequently processed data may be adjusted based on the received feedback signal, which may include GPS data and/or device parameters corresponding to the receiving communication device. The watermarked video data communicated to the receiving communication device may be adjusted based on one or more device parameters corresponding to the receiving communication device and/or GPS information.

20 Claims, 7 Drawing Sheets

(51) Int. Cl.
*H04N 21/258* (2011.01)
*H04N 19/467* (2014.01)
*H04N 21/8358* (2011.01)
*G06F 21/10* (2013.01)
*H04N 21/422* (2011.01)
*H04N 21/658* (2011.01)
*H04L 29/06* (2006.01)
*H04N 21/414* (2011.01)
*H04N 19/61* (2014.01)
*H04L 9/32* (2006.01)

(52) U.S. Cl.
CPC .. *H04N 21/25841* (2013.01); *H04N 19/00557* (2013.01); *G06F 21/10* (2013.01); *H04N 21/25825* (2013.01); *H04N 21/42202* (2013.01); *H04N 21/6582* (2013.01); *H04L 63/10* (2013.01); *G06F 2221/2111* (2013.01); *H04N 21/41407* (2013.01); *H04N 19/00781* (2013.01); *G06F 2221/0737* (2013.01); *G06F 2221/0733* (2013.01); *H04L 65/4084* (2013.01)
USPC .......................................... 382/100; 713/176

METHOD AND SYSTEM FOR VIDEO TRANSMISSION AND PROCESSING WITH CUSTOMIZED WATERMARKING DELIVERY

CROSS-REFERENCE TO RELATED APPLICATIONS/INCORPORATION BY REFERENCE

This application is a continuation of U.S. Utility patent application Ser. No. 12/428,943 entitled, "METHOD AND SYSTEM FOR VIDEO TRANSMISSION AND PROCESSING WITH CUSTOMIZED WATERMARKING DELIVERY," filed on Apr. 23, 2009, which is hereby incorporated herein by reference in their entirety.

U.S. Utility patent application Ser. No. 12/428,943 claims priority to U.S. Provisional Application Ser. No. 61/101,849 filed on Oct. 1, 2008, which is hereby incorporated herein by reference in their entirety.

FIELD OF THE INVENTION

Certain embodiments of the invention relate to digital media protection. More specifically, certain embodiments of the invention relate to a method and system for video transmission and processing with customized watermarking delivery.

BACKGROUND OF THE INVENTION

Communication systems provide several options for obtaining access to broadcast video content. Consumers may receive broadcast standard definition (SD) and high definition (HD) television broadcasts from the air with an antenna. Analog and digital cable television networks distribute a variety of television stations in most communities on a subscription basis. In addition, satellite television and new internet protocol (IP) television services provide other subscription alternatives for consumers. Analog video signals may be coded in accordance with a number of video standards including NTSC, PAL and SECAM. Digital video signals may be encoded in accordance with standards such as Quicktime, (motion picture expert group) MPEG-2, MPEG-4, or H.264. In addition to digital coding, some video signals are scrambled to provide access to these signals, only to the subscribers that have paid to access the particular content.

The desire for video content has driven cellular telephone networks to begin offering video programs to their subscribers as streaming video. In this fashion, users of mobile devices may have access to video programming on the go. Some of the techniques used in providing broadcast video content to stationary devices are not suitable for adaptation to the viewing environment associated with a handheld mobile device.

Watermarking is a technique utilized to protect digital media from unauthorized use or illegal copying, such as with copyrighted material, for example. Watermarking of digital media may fall into two categories: visible or invisible. Visible watermarks are typically added to digital images to indicate ownership and to thwart unauthorized use of the images. The watermark may comprise the identity of the owner and/or a copyright symbol and date, for example. This type of watermark may be considered a spatial watermark in that the data is embedded spatially in an image, and the watermark signal is distinct from the original image data. Spatial watermarks may not be robust against attacks due to the ability of filtering, removing and/or cropping the data.

Invisible watermarks do not change the image to a perceptible extent. This may be accomplished by minor changes in the least significant bits of the original data. Watermarks that are unknown to the end user may be designated as steganographic watermarks.

A watermarking process may embed the data in the frequency domain, making it more robust against attack. The technique may be analogous to spread spectrum encoding in communications, where the data to be embedded may be spread over a multitude of frequencies by modulating the watermark signal with pseudo-noise before adding it to the original data. The low signal amplitude, due to the watermark being invisible, the large bandwidth of the original data (image or video, for example), and the shortness of the watermark message, are all factors that indicate spread spectrum encoding is a logical choice.

In addition to embedding a watermark in digital multimedia data, detecting whether a watermark is present may also be important in the protection of multimedia data. Multimedia players may include watermark sensing electronics to preclude the use of unauthorized or pirated media.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for video transmission and processing with customized watermarking delivery, substantially as shown in and/or described in connection with at least one of the figures, as set forth more completely in the claims. Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for video transmission and processing with customized watermarking delivery. Exemplary aspects of the invention may comprise watermarking data at a communication device utilizing received global positioning (GPS) data and communicating the watermarked video data from the communication device to a receiving communication device. The receiving communication device may verify the watermarked data. The receiving communication device may determine whether to render the received watermarked data based on the verification. The watermarked data may comprise multimedia information comprising voice, video and/or text information. The communication device may comprise an edge device. The receiving communication device may comprise a wired and/or a wireless communication device. The communication device may receive a feedback signal communicated from the receiving communication device. The watermarking of subsequently processed data may be adjusted based on the received feedback signal. The feedback signal may comprise GPS data and/or device parameters corresponding to the receiving communication device. The device parameters may comprise one or more of: a power state, a device resolution, a screen size and a display setting of the receiving communication device. The watermarked video data communicated to the receiving communication device may be adjusted based on one or more device parameters corresponding to the receiving communication device and/or GPS information corresponding to the receiving communication device. The communication device may transcode data corresponding to the watermarking from a first format to a second format.

Figure 1:
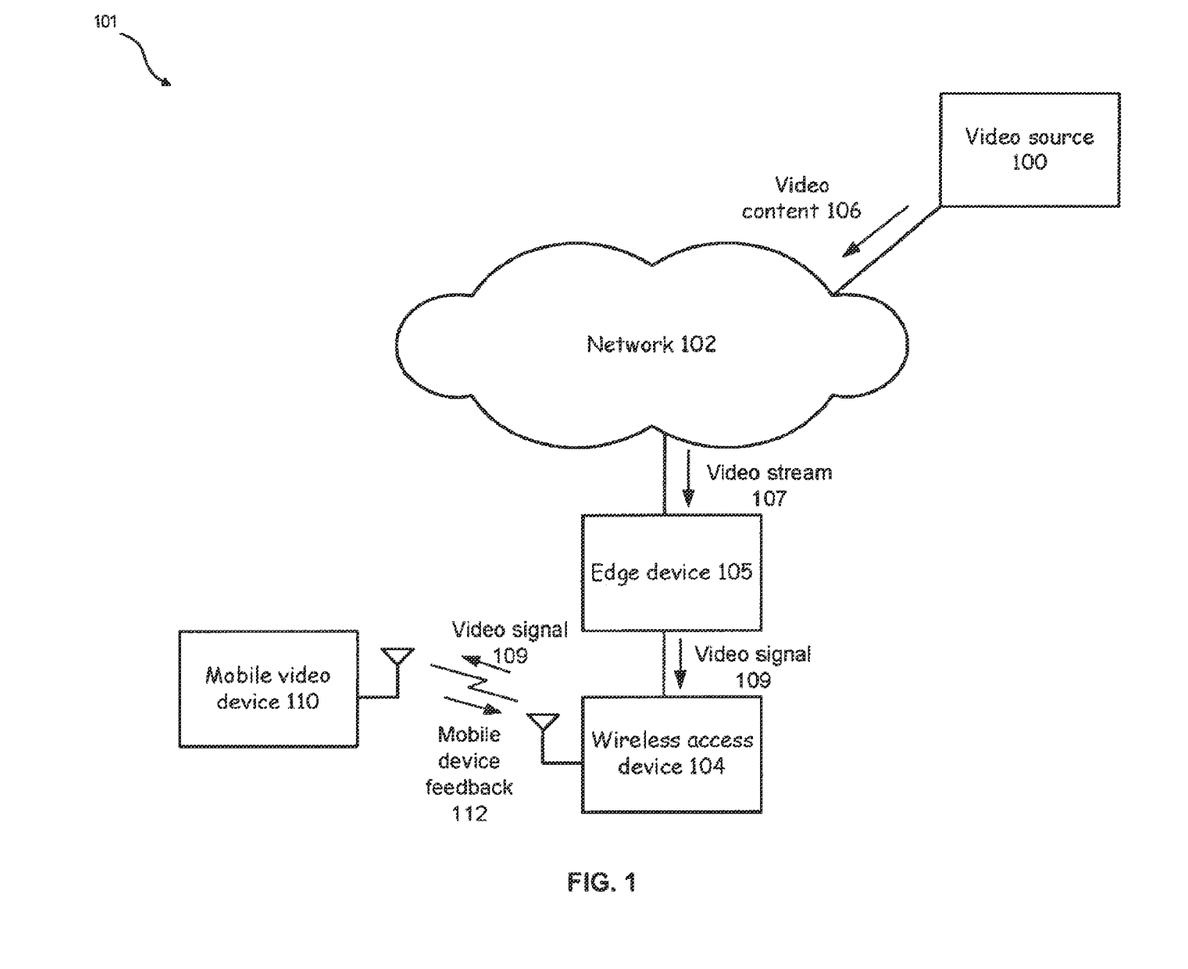
FIG. 1 is a block diagram of an exemplary video network, in accordance with an embodiment of the invention.

FIG. 1 is a block diagram of an exemplary video network, in accordance with an embodiment of the invention. Referring to FIG. 1, there is shown a video network 101 comprising a video source 100, a network 102, a wireless access device 104, an edge device 105, and a mobile video device 110. There is also shown video content 106, a video stream 107, a video signal 109, and mobile device feedback 112.

The network 102 may comprise equipment comprising suitable logic, circuitry and/or code that may enable transport and/or distribution of multimedia content. In this regard, the network 102 may comprise a dedicated video distribution network such as a direct broadcast satellite network or cable television network that may enable distribution of video content 106 from a plurality of exemplary video sources, such as the video source 100, a plurality of wireless access devices and optionally wired devices over a wide geographic area. In another embodiment of the invention, the network 102 may be a heterogeneous network that may comprise one or more segments of a general purpose network such as the Internet, a metropolitan area network, wide area network, local area network or other networks such as an Internet protocol (IP) television network, for example.

The wireless access device 104 may comprise suitable logic, circuitry and/or code that may enable access to a network by a subscriber device. In this regard, the wireless access device 104 may comprise a base station or access point that may provide video content 106 to a plurality of video subscribers over a cellular network such as an Universal Mobile Telecommunications System (UMTS), enhanced data rates for GSM evolution (EDGE), 3G, 4G or other cellular data network, a wireless local area network (WLAN) such as an 802.11a, b, g, n, WIMAX, or other WLAN network. In an exemplary embodiment of the invention, the wireless access device 104 may comprise a home gateway, video distribution point in a dedicated video distribution network or other wireless gateway for wirelessly transmitting the video content 106, either alone or in association with other data, signals or services, to the mobile video device 110.

The edge device 105 may comprise suitable logic, circuitry and/or code that may provide exemplary functions such as multimedia content distribution, routing and/or switching. In this regard, the edge device 105 may comprise a server and/or router, such as an edge router, switch, hub, gateway device or other network module that may receive a video stream 107 that may contain the video content 106. The edge device 105 may be enabled to process the video stream 107 to produce a video signal 109 for transmission to the mobile video device 110. In an exemplary embodiment of the invention, the edge device 105 may receive mobile device feedback 112, which may comprise a device parameter, power state, measurements of channel characteristics, location data or other data that may be used by the edge device 105 in the processing of video stream 107.

The mobile video device 110 may comprise suitable logic, circuitry and/or code that may be enabled to handle the reception, transmission, processing and/or consumption of multimedia information or data. In an exemplary embodiment of the invention, the mobile video device 110 may comprise a video enabled wireless telephone or other handheld communication device with wireless connectivity via a wireless data card, wireless tuner, WLAN modem or other wireless link or device that alone or in combination with other devices may be capable of receiving the video signal 109 from the wireless access device 104 and storing and/or displaying the video content 106 for a user. In another embodiment of the invention, the mobile video device 110 may comprise a wired device.

The video content 106 may comprise analog signals such as National Television System Committee (NTSC), Séquentiel couleur à mémoire (SECAM) or Phase Alternating Line (PAL) coded video signals, or digital video signals such as Quicktime, (motion picture expert group) MPEG-2, MPEG-4, H.264, or other format, either standard or proprietary that may be carried via an IP protocol such as TCP/IP, Ethernet protocol, Data Over Cable Service Interface Specifications (DOCSIS) protocol or other protocol.

In operation, the network 102 may distribute information such as video content 106 from a video source 100 to a wireless access device 104 for wireless transmission to wireless video devices such as the mobile video device 110 or other video devices, for example. The video content 106 may comprise movies, television shows, commercials or other ads, educational content, infomercials, or other program content and optionally additional data associated with such program content including but not limited to digital rights management data, control data, programming information, additional graphics data and other data that may be transferred in associated with program content. The video content 106 may comprise video with or without associated audio content. The video content 106 may be sent as broadcast video, streaming video, video on demand and near video on demand programming and/or other formats.

In accordance with an exemplary embodiment of the invention, the edge device 105 may receive the video stream 107 from the network 102 may convert it from a first format, such as a first digital format used in one portion of the network 102, to another format, such as MPEG-2, H.264 or other digital format used to communicate with the wireless access device 104. The wireless access device 104 may communicate the video signal 109 to the mobile video device 110. In an embodiment of the invention, the edge device 105 may watermark the video stream 107 utilizing GPS information prior to communicating the video signal 109 to the wireless access device 104. In this manner, the edge device 105 may control which mobile video devices, such as the mobile video device 110, may have access to video data.

Figure 2:
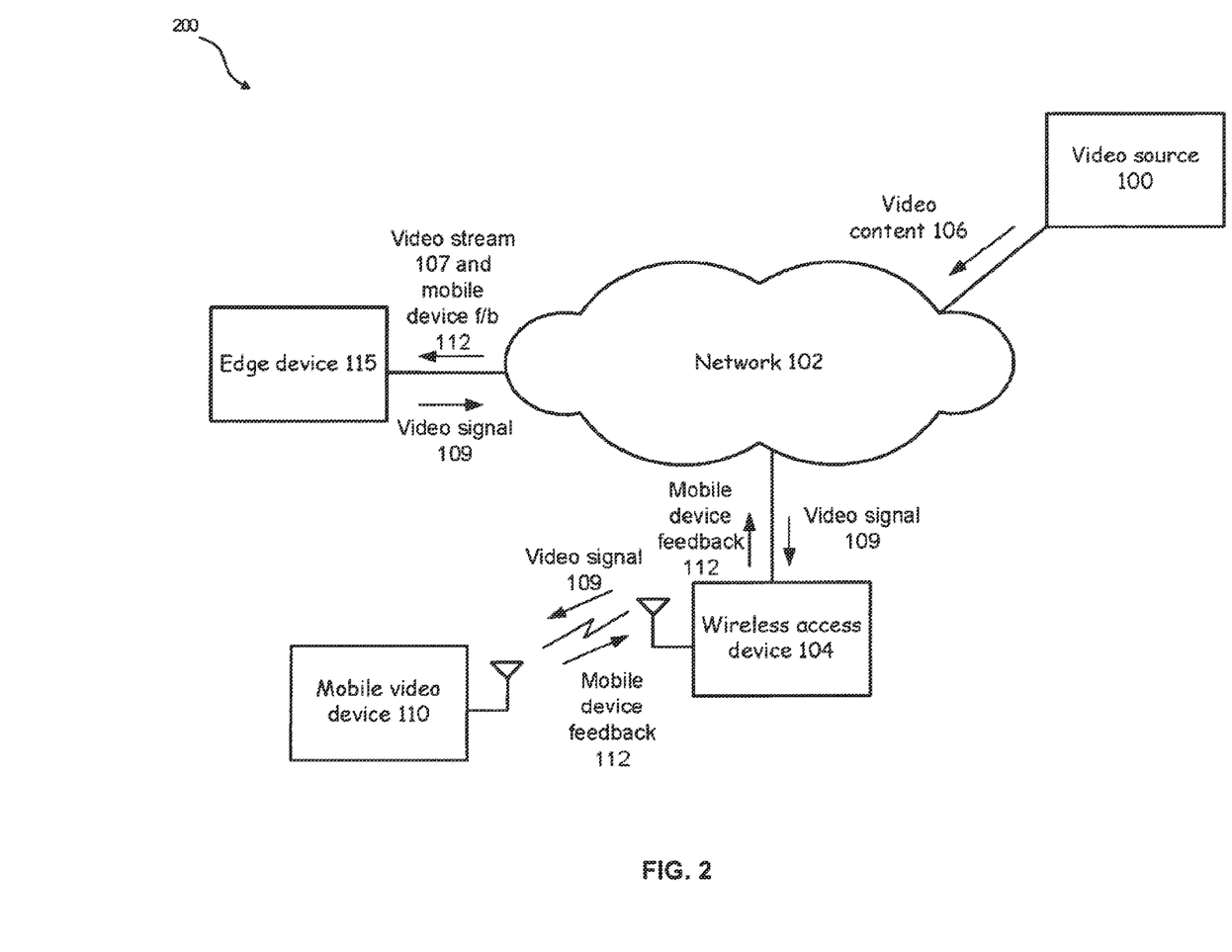
FIG. 2 is a block diagram of an exemplary video network, in accordance with another embodiment of the invention.

FIG. 2 is a block diagram of an exemplary video network, in accordance with another embodiment of the invention. Referring to FIG. 2, there is shown a video network 200 comprising the video source 100, the network 102, the wireless access device 104, an edge device 115, and the mobile video device 110. There is also shown the video content 106, a video stream 107, the video signal 109, and mobile device feedback 112. The video source 100, the network 102, the wireless access device 104, and the mobile video device 110 may be as described with respect to FIG. 1.

The edge device 115 may be substantially similar to the edge device 105, described with respect to FIG. 1, but may be located remotely from the wireless access device 104. While the edge device 115 is shown as being connected to, but apart from, the network 102, the edge device 115 may be considered as part of the network 102, particularly in a configuration where the network 102 may be a heterogeneous network and the edge device 115 comprises an edge router, gateway, or a hub device that may convert a video stream 107 from a first format, such as a first digital format used in one portion of the heterogeneous network, to another format, such as MPEG-2, H.264 or other digital format used to communicate with the wireless access device 104.

In operation, portions of the network 102 may transport the video signal 109 and the mobile device feedback 112 between the edge device 115 and the wireless access device 104. The video content 106 may comprise movies, television shows, commercials or other ads, educational content, infomercials, or other program content and optionally additional data associated with such program content including but not limited to digital rights management data, control data, programming information, additional graphics data and other data that may be transferred in associated with program content. The video content 106 may comprise video with or without associated audio content. The video content 106 may be sent as broadcast video, streaming video, video on demand and near video on demand programming and/or other formats.

The edge device 115 may receive the video stream 107 and mobile device feedback 112 from the network 102 and may convert it from a first format, such as a first digital format used in one portion of the network 102, to another format, such as MPEG-2, H.264 or other digital format used to communicate with the wireless access device 104 via the network 102. The wireless access device 104 may communicate the video signal 109 to the mobile video device 110. In an embodiment of the invention, the edge device 115 may watermark the video stream 107 utilizing GPS data prior to communicating the video signal 109 to the wireless access device 104 via the network 102. In this manner, the edge device 115 may control which mobile video devices, such as the mobile video device 110, may have access to video data.

Figure 3:
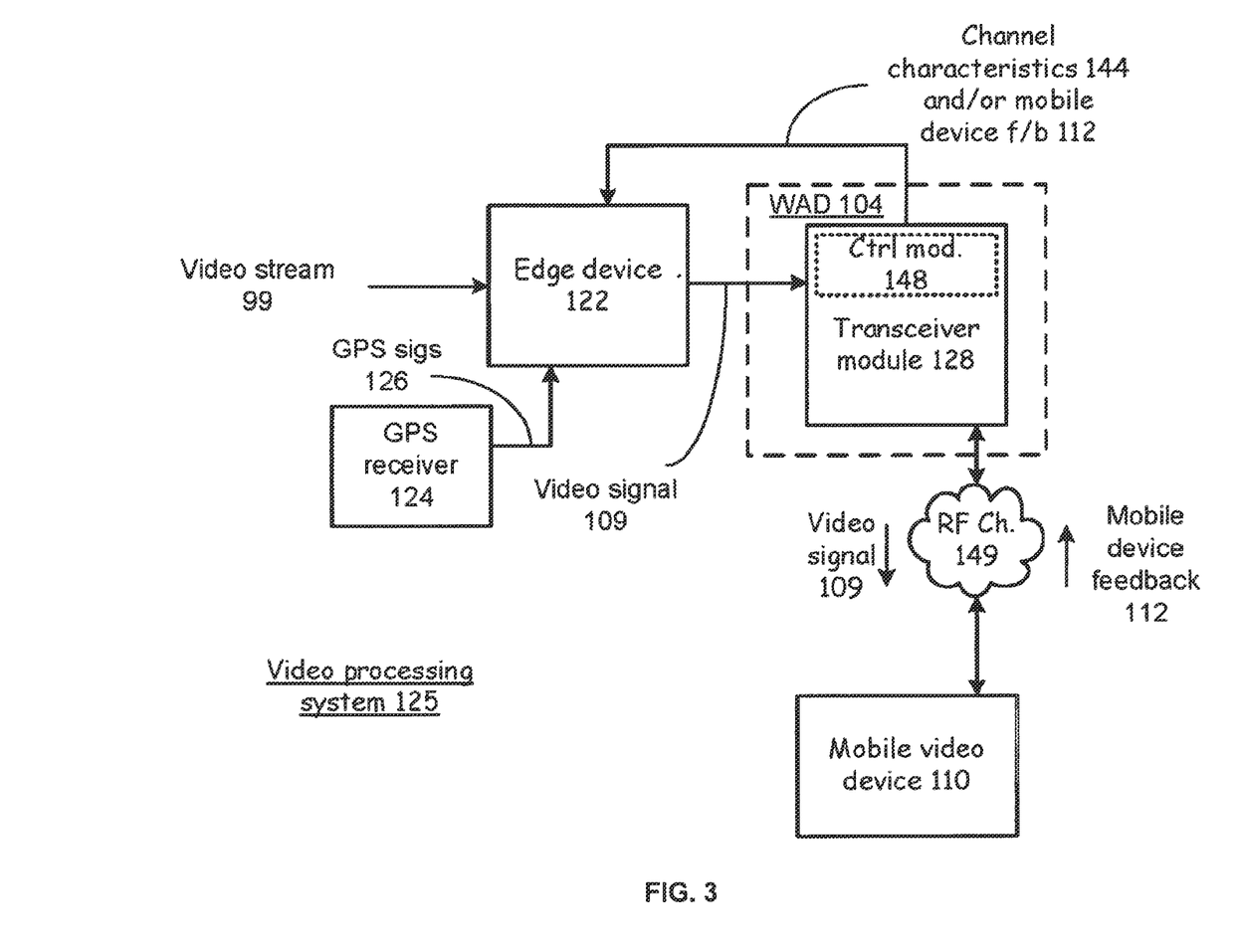
FIG. 3 is a block diagram of an exemplary video processing system, in accordance with an embodiment of the invention.

FIG. 3 is a block diagram of an exemplary video processing system, in accordance with an embodiment of the invention. Referring to FIG. 3, there is shown a video processing system 125 comprising the wireless access device 104, the mobile video device 110, an edge device 122, and a global positioning satellite (GPS) receiver 124. The edge device 122 may be substantially similar to the edge device 105 described with respect to FIG. 1. There is also shown a video stream 99, the video signal 109, GPS signals 126, a channel characteristics and/or mobile device feedback 144 and RF communication channels 149.

The wireless access device 104 may be as described with respect to FIG. 1, but may further comprise a transceiver module 128 and a control module 148. The transceiver module 128 may be enabled to create RF signals comprising the video signal 109 for transmission to the mobile video device 110 via one or more RF communication channels 149. The edge device 122 may be enabled to receive the mobile device feedback 112 from the mobile device 110 via the wireless access device 104.

The GPS receiver 124 may comprise suitable circuitry, logic and/or code that may be enabled to receive GPS data from one or more GPS satellites and may be enabled to determine the edge device 122's position from the received GPS data. For example the GPS receiver 124 may determine the edge device 122's position based on ephemeris, signal delay and satellite position.

The edge device 122, which may be similar to the edge device 105 or 115, may comprise suitable logic, circuitry and/or code that may be enabled to process the video stream 99, such as the video stream 107 or other video stream that may comprise the video content 106, described with respect to FIG. 1, to produce the video signal 109. The processing may be configured based on the mobile device feedback 112, such that a watermark to be embedded in the video signal 109 may comprise GPS data of the target wireless device, for example.

In an embodiment of the invention, the edge device 122 may comprise suitable logic, circuitry and/or code that may enable encoding and/or transcoding of multimedia data. In an exemplary embodiment of the invention, the edge device 122 may comprise a video encoder and/or a transcoder that may be implemented using one or more microprocessors, microcontrollers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module.

In instances where the edge device 122 may be implemented with two or more devices, each device may perform the same steps, processes or functions in order to provide fault tolerance or redundancy. In another embodiment of the invention, the function, steps and processes performed by the edge device 122 may be split between different devices to provide greater computational speed and/or efficiency. The associated memory module may be a single memory device or a plurality of memory devices. An exemplary memory device may comprise a read-only memory, random access memory, volatile memory, non-volatile memory, static random access memory (SRAM), dynamic random access memory (DRAM), flash memory, cache memory, and/or any device that stores digital information.

In instances when the edge device 122 may implement one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

In operation, the edge device 122 may generate the video signal 109 by configuring the video stream 99 based on the mobile device feedback 112. In this manner, a video signal 109 may be transmitted to the mobile video device 110, via the wireless access device 104, that may be formatted based on the particular characteristics of that device, and may be adapted to the particular channel conditions, including authentication data that may be based on the timing information used by the mobile communication device or based on its location, for example. The edge device 122 may receive GPS signals 126 from the GPS receiver 124, and may also receive channel characteristics 144 and/or the mobile device feedback 112. These received signals may be utilized by the edge device 122 to generate and embed a customized watermark for the video signal 109. Additionally, the mobile device feedback 112 may be utilized to configure the video signal in an appropriate format suitable for the mobile video device 110.

The video signal 109, which may comprise an embedded watermark, may then be communicated to the wireless access device 104. The wireless access device 104 may be enabled to communicate the video signal 109 to the mobile video device 110, and may receive the channel characteristics 144 and/or the mobile device feedback 112, which may be communicated to the edge device 122. In this manner, the configuration of the video signal 109 may be customized for the mobile video device 110, and may also provide for improved security in instances where the GPS signals 126 may be utilized to verify that a mobile video device is the targeted destination device to receive the video signal 109.

Figure 4:
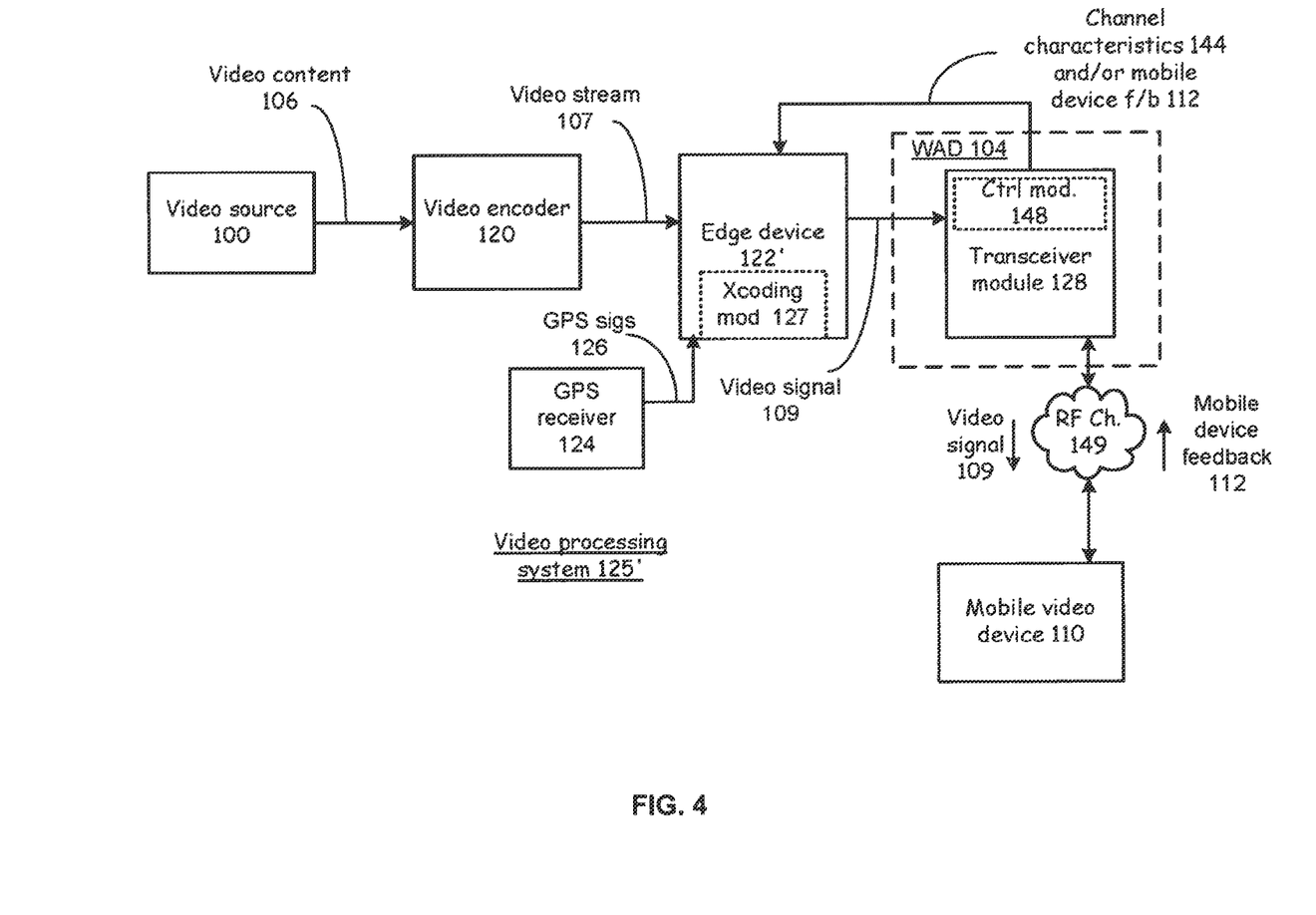
FIG. 4 is a block diagram of an exemplary video processing system, in accordance with another embodiment of the invention.

FIG. 4 is a block diagram of an exemplary video processing system, in accordance with another embodiment of the invention. Referring to FIG. 4, there is shown a video processing system 125' comprising the wireless access device 104, the mobile video device 110, an edge device 122', the video source 100, a video encoder 120, and the GPS receiver 124. The edge device 122 may be substantially similar to the edge device 105 described with respect to FIG. 1. There is also shown a video stream 99, the video signal 109, channel characteristics 144 and/or mobile device feedback 112 and RF communication channels 149.

The video processing system 125' may be used in conjunction with the network 102, described with respect to FIG. 1. Notwithstanding, the video encoder 120 may comprise suitable circuitry, logic, and/or code that may enable encoding of a video stream that may comprise the video content 106 and generation of the video stream 107. While shown as separate from the video source 100, the video encoder 120 may be incorporated into the video source 100 or may be downstream of the video source 100 in the network 102. For instance, the encoder 120 may be incorporated in a head-end, video server, edge router, video distribution center, or any other network element of the network 102.

The edge device 122' may comprise suitable logic, circuitry and/or code that may enable transcoding of information for one format to another format. In an exemplary embodiment of the invention, the edge device 122' may comprise a transcoding module 127 that may generate the video signal 109 by transcoding the video stream 107 from a watermark (video) format to a second watermark (video) format. The edge device 122' may be enabled to remove conditional access scrambling and implement a DRM for the service. The use of the transcoding module 127 may provide additional flexibility in the edge device 122' in configuring the video parameters of the video stream 107 when generating the video signal 109 as well as altering the overall format when generating the video signal 109.

In operation, the edge device 122' may mark flows of video content with source-destination device/user specific watermarks to prevent unauthorized distribution of content by enabling the transcoding module 127 to insert the watermark in the compressed bit streams. In one embodiment of the invention, the transcoding module 127 may comprise a layer encoding device that may generate the watermark. The GPS receiver 124 may provide the source location info for the watermark. The destination/receiving device local info may be provided by the mobile video device 110 through the mobile device feedback 112 and such info may also be a part of the watermark being inserted into the bit streams. The GPS data utilized by the edge device 122' may comprise exemplary information such as clock, location, vector, and cellular maps for example.

In another embodiment of the invention, the watermark may be generated and inserted based on the state of the mobile video device 110 received from the mobile device feedback 112 to adapt the content format, such as frame rate, color scale or black and white operation, and resolution. In an exemplary embodiment of the invention, watermarking data may be embedded into the enhancement layer or layers for layered coding. For transcoding, the watermark may be inserted into high bit-rate frames to ensure robustness and detectability.

Watermark embedding may be considered as a function that involves the original media (content) data $\vec{V}$, an embedding key $\vec{K}$, a set of parameters $\vec{P}$ that control the embedding procedure/algorithm, and a message $\vec{M}$ that may be embedded in the video and/or audio. The message data $\vec{M}$ may be considered as a sequence of bits. The set of parameters $\vec{P}$ may comprise, for example, the so-called watermark embedding factor, i.e. a parameter that controls the amount of degradation that may be inflicted on the original media data by the watermark. The output of the watermark embedding function comprise watermarked data $\vec{W}$. Thus, the watermark embedding function may be of the following exemplary form:

$$\vec{W}=\vec{f}(\vec{V},\vec{K},\vec{M},\vec{P}).$$

Figure 5:
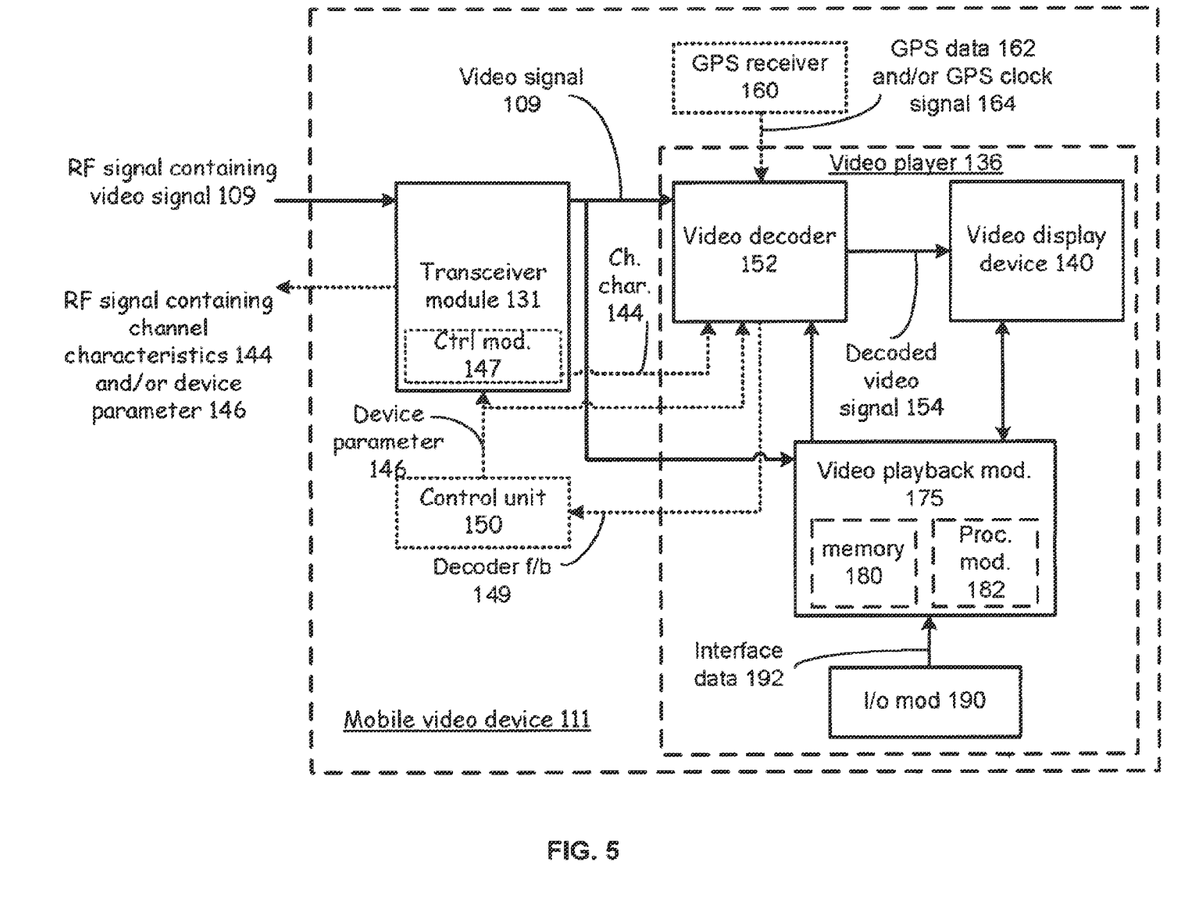
FIG. 5 is a block diagram of a mobile video device, in accordance with an embodiment of the invention.

FIG. 5 is a block diagram of a mobile video device, in accordance with an embodiment of the invention. Referring to FIG. 5, there is shown a mobile video device 111 comprising a transceiver module 131, a video player 136, a control unit 150, and a GPS receiver 160. The video player 136 may comprise a video display device 140, a video decoder 152, a video playback module 175, and an input/output (I/O) module 190.

The transceiver module 131 may comprise suitable circuitry, logic, and/or code that may enable receiving RF signals comprising the video signal 109 and may demodulate and down convert the RF signals to extract the video signal 109. The video player 136 may comprise the video decoder 152 that may be enabled to generate a decoded video signal 154 for display on the video display device 140, which may comprise a plasma display, LCD display, cathode ray tube (CRT), for example, that either directly or via projection, creates a video display for an end-user.

In an exemplary embodiment of the invention, the video decoder 152 may operate in a plurality of modes of operation. These exemplary modes of operation may be selected based on a device parameter 146 received from the control unit 150 to conform the decoding of the video signal 109 with the device specific watermarking data.

The video decoder 152 may comprise suitable logic, circuitry and/or code that may be enabled to produce a decoded video signal 154 from the video signal 109, based on the device parameter 146 provided by the control unit 150. The device parameter 146 may comprise a processing request (as a part of device parameters), such as requiring a device location verification. Such a request may be securely stored in the control unit 150 of the mobile video device 111, for example. In addition, the control module 147 of the transceiver module 131 may check the device location verification status that may also be provided to an edge device, such as the edge device 122' via mobile device feedback 112, described with respect to FIG. 4, and to the video decoder 152. The video decoder 152 may be enabled to decode the video signal 109 with the watermark to generate decoded video signal 154 based on the particular device parameters 146 and channel characteristics 144.

In instances where the control module 147 of the transceiver module 131 may determine that the channel conditions do not support a high quality signal, the mobile device feedback 112, may indicate this to the edge device 122', as described with respect to FIG. 4, that may generate the video signal 109 to adjust watermarking methods, for example. In this manner, the video decoder 152 may receive an indication via channel characteristics 144 and decode the video signal 109 accordingly.

In another exemplary embodiment of the invention, the control unit 150 may determine a state of the video player 136, such as a power state, for example, and may adjust the one or more device parameters 146 in response. In this manner, the control unit 150 may control the video decoder 152 to a lower frame rate, lower color scale or to black and white operation, to a reduced resolution and/or to other state corresponding to a reduced power state that may include reduced processor speed and reduced computational abilities, shutting down one or more MIMO channels of the transceiver 130 or otherwise reducing the reception bandwidth, for example. These changes in reception and decoding based on the reduced power state may save processing power and help increase battery life. The device parameters 146 may be adaptively used for the watermark insertion in the edge device to ensure the robustness of watermark.

The video decoder 152 may comprise suitable logic, circuitry and/or code that may enable generation of one or more decoder feedback parameters 149 based on an amount or frequency of decoder errors. The decoder feedback parameter 149 may be supplied to the control unit 150 and may be used by the control unit 150 to determine the state of the device and to adjust the one or more device parameters 146 in response. In this manner, the control unit 150 may configure the video decoder 152 to a lower frame rate, lower color scale or to black and white operation, to a reduced resolution and/or to other state to control the decoder feedback to an acceptable level so that the video player may play the video signal 109 in accordance with the these device parameters. The decoder feedback 149 may be included in the device parameter 146 that may be sent as the mobile device feedback 112 to the edge device 122'.

The video decoder 152 may be implemented in hardware, software and/or firmware. Various embodiments of the video decoder 152 may be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. In instances where the video decoder 152 may be implemented with two or more devices, each device may perform the same steps, processes or functions in order to provide fault tolerance or redundancy. Alternatively, the function, steps and processes performed by the video decoder 136 may be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. In instances where the video decoder 152 may implement one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

The mobile video device 111 may comprise a GPS receiver 160. The GPS receiver 160 may comprise suitable logic, circuitry and/or code that may be enabled to receive and/or generate the GPS data 162 that may be communicated to the edge device 122 as the mobile device feedback 112 for watermarking and optionally used by the video decoder 152 for authentication of the video signal 109. The GPS clock signal 164 may be used as a global clock signal for synchronizing the timing of the mobile video device 111 and the edge device 122, and for controlling the timing of the decoding and playback of video signal 109. The presence of the GPS receiver 160 and/or the receipt of current GPS data 162 or GPS clock signals 164 may be used by the mobile device 111 to trigger mobile device feedback 112 sent to edge device 122, as shown in FIG. 3, that indicates the availability of GPS data in the mobile device 111 for the purposes of timing and/or authentication.

The location data received via mobile device feedback 112 as described with respect to FIG. 3, may be used to generate location-based authentication data that may be embedded in the video signal 109 as a part of the watermark. The video decoder 152 may comprise an authentication routine that compares the location data from the authentication data of the video signal 109 to its own location data, such as GPS data 162 generated by GPS receiver 160. If the location data included in the authentication data compares favorably to the GPS data 162, the video signal 109 may be authenticated and the playback of video signal 109 by mobile video device 110 may be enabled. In instances where the location data included in the authentication data varies from the GPS data 162 by more than an authentication threshold such as 1 mile, 5 miles or some greater or lesser distance based on the desired level of security, the playback of the video signal 109 by the mobile video device 111 may be disabled.

The mobile video device 111 may comprise an I/O module 190 and a video playback module 175 comprising a memory 180 and a processing module 182 that may execute an application for storing selected video signals 109 as a plurality of stored video files and playing back these video files. The I/O module 190 may comprise a user interface module comprising one or more buttons, a keyboard, keypad, a click wheel, touch screen, a microphone, speaker and/or other user interface devices for example, that allow the video playback module 175 to interact with the user by providing prompts either directly or via screen displays that are generated by the video playback module 175 and displayed on the video display device 140, to receive commands and other interface data 192 in response to actions of a user of mobile video device 111.

In an embodiment of the invention, the processing module 182 may perform the watermark detection/verification and may be implemented using one or more microprocessors, micro-controllers, digital signal processors, microcomputers, central processing units, field programmable gate arrays, programmable logic devices, state machines, logic circuits, analog circuits, digital circuits, and/or any devices that manipulate signals (analog and/or digital) based on operational instructions that are stored in a memory module, such as the memory 180. In instances where the processing module 182 may be implemented with two or more devices, each device may perform the same steps, processes or functions in order to provide fault tolerance or redundancy. Alternatively, the function, steps and processes performed by the processing module 182 may be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. In instances where the processing module 182 may implement one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

In operation, the video playback module 175 may receive commands from a user to store a video signal 109 as a digital video file in memory 180. The user may also navigate through stored video files and select a stored video file for playback. During playback, the processing module 182 may convert the stored video file to a video signal that may be provided to the video decoder 152 that generates a decoded video signal 154 for display on the display device 140. The I/O module 190 may provide one or more exemplary control buttons comprising play, stop, pause, fast forward, rewind, slow motion, and may generate interface data 192 used by processing module 182 to control the playback of a stored video file in response to user commands. Additionally, the video playback module 175 may generate navigation data for each stored video file that may be used in a video navigation routine that allows a user to select a stored video file for playback based on the navigation data and based on interface data 192 generated in response to the action of a user.

Figure 6:
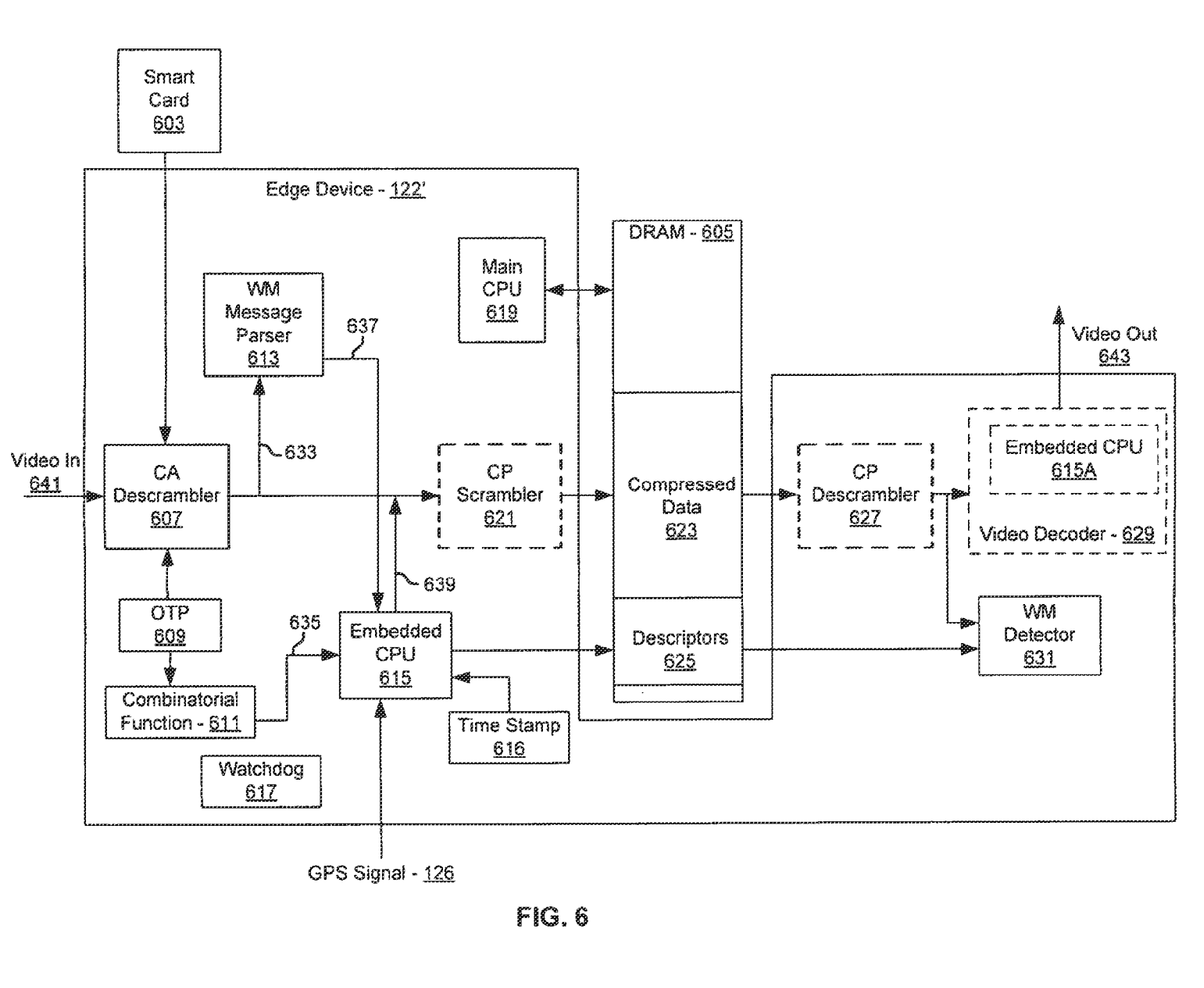
FIG. 6 is a block diagram illustrating a watermarking system in a mobile video device, in accordance with an embodiment of the invention.

FIG. 6 is a block diagram illustrating a watermarking system in a mobile video device, in accordance with an embodiment of the invention. Referring to FIG. 6, there is shown the edge device 122', a smart card 603 and a DRAM 605. The edge device 122' may comprise a conditional access (CA) descrambler 607, a one-time programmable (OTP) memory 609, a combinational function block 611, a watermark message parser 613, an embedded CPU 615, a time stamp counter 616, a watchdog timer 617, a main CPU 619, a copy protection (CP) scrambler 621, a CP descrambler 627, a video decoder 629 and a watermark detector 631. There is also shown input and output signals, namely, video in 641 and video out 643, respectively. The edge device 122' may be as described with respect to FIG. 4

The DRAM 605 may comprise suitable circuitry, logic and/or code that may enable storage of code to be used by the CPU 619 for control of the edge device 122'. The DRAM 605 may also comprise the compressed data 623 and the descriptors 625. The compressed data 623 region of the DRAM 605 may comprise compressed and watermarked video data, and the descriptor 625 section of the DRAM 605 may comprise data that may be utilized by the watermark detector 631 to determine the location of the watermarks to verify that the watermarks were properly inserted. The compressed data 623 and the descriptors 625 may not be accessed by the main CPU 619, and may only be accessed by the embedded CPU 615, which may enhance system security.

The smart card 603 may comprise suitable circuitry, logic and/or code that may enable storage of data for the descrambling of the received video in 641. The data stored in the smart card 603 may comprise CA descrambling keys or service provider specific data, for example.

The CA descrambler 607 may comprise suitable circuitry, logic and/or code that may enable conditional access descrambling of received video signals. The CA descrambler may receive as inputs the input signal, video in 641, data stored in the smart card 603 and unique identifier data stored in the OTP 609. Video signals may be CA scrambled by a service provider to control access to content to authorized users only.

The OTP memory 609 may comprise suitable circuitry, logic and/or code that may enable storage of unique identifier data specific to the edge device 122', such that an embedded watermark may comprise information about the source and/or destination of the data. Additionally, the OTP memory 609 may store keys to be utilized by the CA descrambler 607.

The combinational function block 611 may comprise suitable circuitry, logic and/or code that may enable combining, or scrambling of unique identifier data stored in the OTP 609 with a combinatorial function. The resulting unique ID 635 may be communicated to the embedded CPU 615 to be included in the watermark inserted into the video data.

The watermark message parser 613 may comprise suitable circuitry, logic and/or code that may enable "snooping" data from the CA descrambler 607 to detect watermarking messages that may be in the video data stream. In an exemplary embodiment of the invention, the watermark message parser 613 may comprise hardware, as opposed to software, to reduce and/or eliminate the ability of a hacker to interfere with the detection of watermarking messages. The watermark message parser may generate a trigger signal 637, which may trigger the embedded CPU 615 to initiate a watermark insertion process.

The embedded CPU 615 may comprise suitable circuitry, logic and/or code that may enable control of the watermark embedding process. The embedded CPU 615 may be entirely separate from the main CPU 619 so that software code from third parties, or hackers, may not affect the watermark embedding process. Accordingly, the embedded CPU 615 may utilize signed code only, which may prevent modification of the code by external means.

In addition to signing the code of the embedded CPU 615, the code may also be stored externally encrypted, in order to prevent exposing the watermark insertion or extraction algorithm. In such a case, the code of the embedded CPU 615 may be decrypted on-chip, then stored in a region of the DRAM 605 which may only be accessible to the embedded CPU 615, and off-limits to other processors. Storing the data in a non-CPU accessible region may help prevent theft of pre-watermarked data in instances where the watermark insertion occurs on the decompressed data. Furthermore, the DRAM 605 contents may only be written to DRAM in scrambled form, in order to prevent pin snooping which may reveal the contents of the embedded CPU code, or other sensitive watermark and non-watermark related parameters. The embedded CPU 615 may generate and insert the watermark 639 in the video data received from the CA descrambler 607.

In an embodiment of the invention, the embedded CPU 615 may receive the GPS signal 126 as an input and may incorporate GPS data into the watermark 639. In another embodiment of the invention, the embedded CPU 615 may insert the descriptors 625 in the DRAM 605, which may be utilized by the watermark detector 631 to identify the location of the watermarks in the video data and verify that they were properly inserted. The descriptors 625 may not be accessed by the main CPU 619, thus increasing the security level of the edge device 122'. Additionally, the embedded CPU 615 may be enabled to insert watermark video before or after storage in the compressed data 623 of the DRAM 605.

The time stamp counter 616 may comprise suitable circuitry, logic and/or code that may enable insertion of the time-of-day and date information into the watermark itself, so that a suspect stream may be analyzed to see when it was recorded.

The watchdog timer 617 may comprise suitable circuitry, logic and/or code that may detect whether the embedded CPU 615 may be functioning and responding to interrupts from the watermark message parser 613. In instances where the watchdog timer 617 may determine that the embedded CPU 615 may be incorrectly configured or enabled by an unauthorized entity, the edge device 122' may be disabled. Accordingly, the watchdog timer 617 may require a watermark insertion interrupt periodically. If enough time elapses without seeing a watermark insertion interrupt, then the system may be considered "hacked", and the watchdog timer 617 may reset the chip, or take other action which makes the edge device 122' unusable.

The main CPU 619 may comprise suitable circuitry, logic and/or code that may enable overall functional control of the edge device 122'. The main CPU 619 may access the DRAM 605, but may not have access to the compressed data 623 or the descriptors 625 in the DRAM 605. For example, the main CPU 619 may be utilized to update and/or modify programmable parameters and/or values in a plurality of components, devices, and/or processing elements in the edge device 122'.

The CP scrambler 621 may comprise suitable circuitry, logic and/or code that may enable scrambling the watermarked signal before storing in the compressed data 623 section of the DRAM 605. The CP scrambler may enhance security of the system by reducing and/or eliminating a hacker's ability to intercept unscrambled video, and may comprise an optional system component, depending on the security requirements of the edge device 122'. In instances where the watermark may be inserted in video after being read from the compressed data 623 and before the video decoder 629, scrambling the data to be stored in the DRAM 605 may prevent the theft of pre-watermarked data.

The CP scrambler 627 may comprise suitable circuitry, logic and/or code that may enable descrambling of CP scrambled data. In instances where the CP scrambler may have been utilized to CP scramble the video signal received from the CA descrambler 607, the CP descrambler may be utilized to descramble the signal before communicating the signal to the video decoder 629.

The video decoder 629 may comprise suitable circuitry, logic and/or code that may enable decoding a video for display. In instances where a wireless mobile device, such as the wireless device 111 may comprise a video decoder, such as the video decoder 152, both as described with respect to FIG. 5, the video decoder 629 may not be necessary. In another embodiment of the invention, the video decoder 629 may comprise an embedded CPU 615A for embedding a watermark into the video signal. The video decoder 629 may receive as an input the compressed data 623 stored in the DRAM 605, or from the CP descrambler 627 when implemented to descramble a CP scrambled signal and generate an output signal, video out 643.

The watermark detector 631 may comprise suitable circuitry, logic and/or code that may enable detecting the watermark 639 embedded in the video signal by the embedded CPU 615. By comparing the measured watermark to the descriptors 625 stored in the 625, the watermark detector 631 may verify the proper functioning of the watermark process in the edge device 122'.

In operation, a CA scrambled signal may be communicated to the CA descrambler 607. The descrambler 607 may utilize descrambling keys and/or unique identifier data from the smart card 603 and the OTP memory 609 to descramble the input signal, video in 641. The descrambled signal may be parsed by the watermark message parser 613 to determine whether a watermark may be required to be inserted into the video data.

The watermark message parser 613 may generate a trigger signal 637 to enable the embedded CPU 615 to insert a watermark in to the descrambled video signal generated by the CA descrambler 607. The embedded CPU 615 may receive the unique ID 635 from the combinational function block 611 to generate a watermark 639 that may be specific to the edge device 122'. In addition, GPS data may be communicated to the embedded CPU 615 via the GPS signal 126, so that the watermark 639 may comprise location information. In this manner, pirated content may be traced back to the edge device that may have generated the data. The embedded CPU 615 may also store the descriptors 625 in the DRAM 605 for watermark verification by the watermark detector 631.

The watermark messages may be encrypted, and may require an extra decryption step after the CA descrambling. This may prevent exposed CA descrambled data from compromising the underlying messaging and watermarking algorithm, since as soon as the watermark messages may be decrypted they may be removed from the stream. In an alternative embodiment, the watermark messages may be removed and then decrypted.

In instances where CP scrambling may be desired prior to storage, the video signal with the watermark 639 inserted may be communicated to the CP scrambler 621. The resulting scrambled signal may be stored as the compressed data 623 in the DRAM 605. In instances where CP scrambling may not be required, the watermarked video signal may be stored directly as the compressed data 623 in the DRAM 605.

In instances where the CP scrambler 621 may have CP scrambled the watermarked video signal, the compressed data 623 in the DRAM 605 may be communicated to the CP descrambler 627. The resulting descrambled signal may be received by the video decoder 629 and the watermark detector 631. The watermark detector 631 may utilize the descriptors 625 in the DRAM 605 to verify the watermark detected in the watermarked video signal. In instances where the watermark detector 631 determines that the watermark detected in the watermarked video signal may not match the descriptors 625 in the DRAM 605, the edge device 122' may be disabled.

Figure 7:
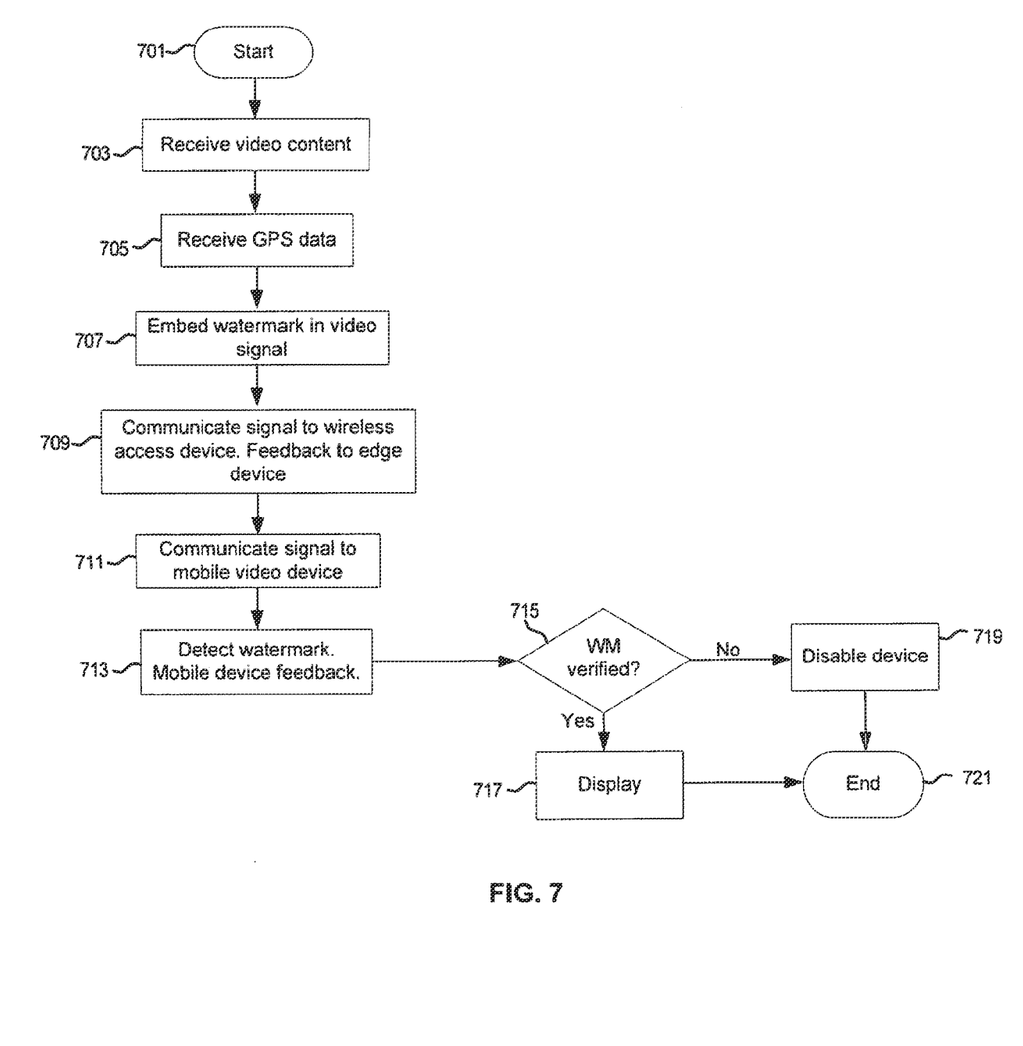
FIG. 7 is a flow diagram of an exemplary video transmission and watermarking process, in accordance with an embodiment of the invention.

FIG. 7 is a flow diagram of an exemplary video transmission and watermarking process, in accordance with an embodiment of the invention. The exemplary steps may begin with step 703, where video content may be communicated from a video source via a network to an edge device. In step 705, GPS data may also be received by the edge device. In step 707, a watermark comprising GPS data may be embedded in the video data, followed by step 709 where the video signal may be communicated to a wireless access device. Additionally, a mobile device feedback signal may be communicated back to the edge device. In step 711, the video signal may be communicated to a mobile video device, followed by step 713, in which the watermark may be extracted and the mobile device feedback signal may be communicated back to the edge device via the wireless access device. In step 715, in instances where the watermark data passed verification, the video data may be displayed in step 717, followed by end step 721. If the verification fails, the exemplary steps may proceed to step 719 where the display of the video on the mobile video device may be disabled, followed by end step 721.

In an embodiment of the invention, a method and system are disclosed for watermarking data at a communication device 122 utilizing received global positioning (GPS) data 126 and communicating the watermarked video data 109 from the communication device 122 to a receiving communication device 110. The receiving communication device 110 may verify the watermarked data 109. The receiving communication device 110 may determine whether to render the received watermarked data 109 based on the verification. The watermarked data 109 may comprise multimedia information comprising voice, video and/or text information. The communication device 122 may comprise an edge device. The receiving communication device 110 may comprise a wired and/or a wireless communication device. The communication device 122 may receive a feedback signal 112 communicated from the receiving communication device 110. The watermarking of subsequently processed data may be adjusted based on the received feedback signal 112. The feedback signal 112 may comprise GPS data and/or device parameters corresponding to the receiving communication device 110. The device parameters may comprise one or more of: a power state, a device resolution, a screen size and a display setting of the receiving communication device. The watermarked video data 109 communicated to the receiving communication device 110 may be adjusted based on one or more device parameters corresponding to the receiving communication device 110 and/or GPS information corresponding to the receiving communication device 110. The communication device 122 may transcode data corresponding to the watermarking from a first format to a second format.

Certain embodiments of the invention may comprise a machine-readable storage having stored thereon, a computer program having at least one code section for video transmission and processing with customized watermarking delivery, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for digital media processing, the method comprising:
   receiving, at a communication device, data to be delivered to a specific destination device;
   obtaining feedback from the destination device, the feedback comprising information specific to the destination device;
   generating a custom watermark using the information included in the feedback from the destination device;
   inserting the custom watermark into the received data to create watermarked data; and
   transmitting the watermarked data to the destination device.

2. The method according to claim 1, wherein said feedback comprises information indicating a location of the destination device and device parameters corresponding to said destination device.

3. The method according to claim 2, wherein said device parameters comprise one or more of: a power state, a device resolution, a screen size and a display setting of said destination device.

4. The method according to claim 1, comprising generating the custom watermark based on GPS information included in the feedback obtained from the destination device.

5. The method according to claim 1, wherein said watermarked data comprises multimedia information comprising voice, video and/or text information.

6. The method according to claim 1, wherein said communication device comprises an edge device.

7. The method according to claim 1, wherein said communication device comprises a wireless communication transceiver.

8. A system for digital media processing, the system comprising:
   one or more circuits in a communication device configured to:
   receive, at the communication device, data to be delivered to a specific destination device
   obtain feedback from the destination device, the feedback comprising information specific to the destination device;
   generate a custom watermark using the information included in the feedback from the destination device;
   embed the custom watermark into the data to generate watermarked data; and said one or more circuits communicates said watermarked data from said communication device to the specific destination device.

9. The system according to claim 8, further comprising the specific destination device, wherein said specific communication device verifies said watermarked data.

10. The system according to claim 9, wherein said specific destination device determines whether to render said received watermarked data based on said verification.

11. The system according to claim 8, wherein said watermarked data comprises multimedia information comprising voice, video and/or text information.

12. The system according to claim 8, wherein said communication device comprises an edge device.

13. The system according to claim 8, wherein said specific destination device comprises a wired and/or a wireless communication device.

14. The system according to claim 8, wherein said one or more circuits enables adjustment of watermarking of subsequently processed data based on said received feedback signal.

15. The system according to claim 8, wherein said feedback comprises GPS data and device parameters corresponding to said specific destination device.

16. The system according to claim 15, wherein said device parameters comprise one or more of: a power state, a device resolution, a screen size and a display setting of said receiving communication device.

17. The system according to claim 8, wherein said one or more circuits enables transcoding of data corresponding to said watermarking from a first format to a second format.

18. A communication device comprising:
receiving circuitry configured to receive a feedback signal from a second communication device, the feedback signal including information specific to the second communication device;
processing circuitry configured to:
generate watermarked multimedia data, the watermarked multimedia data including a watermark generated utilizing the feedback signal;
transcode said watermarked multimedia data from a first format to a second format to generate transcoded watermarked multimedia data; and
transmission circuitry configured to transmit said transcoded watermarked multimedia data from said communication device to the second communication device.

19. The method according to claim 18, wherein said feedback signal comprises device parameters corresponding to said second communication device, said device parameters selected from the group consisting of: a power state, a device resolution, a screen size and a display setting.

20. The method according to claim 18, wherein:
said feedback signal comprises GPS data corresponding to said receiving communication device; and
said watermark is generated based on the GPS data.

\* \* \* \* \*